United States Patent [19]

Spitz et al.

[11] Patent Number: 5,009,868

[45] Date of Patent: * Apr. 23, 1991

[54] PROCESS FOR THE EXTENDED USE OF STRIP ACID EMPLOYED IN THE RECLAMATION OF BATTERY ACID FLUID FROM EXPANDED LEAD-ACID BATTERIES

[75] Inventors: Robert A. Spitz, Holbrook, Mass.; Mark Bricker, Kutztown, Pa.

[73] Assignee: East Penn Manufacturing Co., Inc., Lyon Station, Pa.

[*] Notice: The portion of the term of this patent subsequent to Nov. 20, 2007 has been disclaimed.

[21] Appl. No.: 454,770

[22] Filed: Dec. 21, 1989

Related U.S. Application Data

[63] Continuation-in-part of Ser. No. 312,429, Feb. 2, 1989, Pat. No. 4,971,780, which is a continuation-in-part of Ser. No. 133,132, Dec. 14, 1987, abandoned.

[51] Int. Cl.⁵ ............................................. C01B 17/90
[52] U.S. Cl. .................................... 423/139; 423/522; 423/531; 423/DIG. 2
[58] Field of Search ................ 423/522, 531, DIG. 2, 423/87, 139; 429/49

[56] References Cited

U.S. PATENT DOCUMENTS

| | | | |
|---|---|---|---|
| 900,454 | 10/1908 | Wadhams | 423/47 |
| 3,001,854 | 9/1961 | Kenworthy | 23/117 |
| 3,206,702 | 7/1963 | Greenwood | 338/162 |
| 3,428,449 | 2/1969 | Swanson | 785/117 |
| 3,455,680 | 7/1969 | Ashbrook | 75/117 |
| 3,479,373 | 11/1969 | Orlandini et al. | 260/429 |
| 3,540,860 | 11/1970 | Cochran | 23/338 |
| 3,637,711 | 3/1968 | Budde Jr. et al. | 260/289 |
| 3,841,916 | 10/1974 | Marchetti | 136/165 |
| 3,872,209 | 3/1975 | Hazen et al. | 423/24 |
| 3,927,169 | 12/1975 | Goren et al. | 423/24 |
| 3,950,488 | 4/1976 | Skarbo et al. | 423/24 |
| 3,966,569 | 6/1976 | Reinhardt et al. | 204/108 |
| 4,002,564 | 1/1977 | Carbonel et al. | 210/38 R |
| 4,046,688 | 9/1977 | Cunningham et al. | 210/37 R |
| 4,061,564 | 12/1977 | De Schepper et al. | 210/21 |
| 4,067,802 | 1/1978 | Cronberg et al. | 210/21 |
| 4,082,832 | 4/1978 | Watanabe et al. | 423/70 |
| 4,102,976 | 7/1978 | Hiemeleers et al. | 423/87 |
| 4,210,530 | 7/1980 | Etzel et al. | 210/38 B |

(List continued on next page.)

FOREIGN PATENT DOCUMENTS

| | | |
|---|---|---|
| 2029117 | 12/1970 | Fed. Rep. of Germany . |
| 2515862 | 10/1976 | Fed. Rep. of Germany . |
| 1161432 | 1/1984 | Fed. Rep. of Germany . |
| 51-40396 | of 1976 | Japan . |
| 52-43796 | of 1977 | Japan . |
| 56-160326 | 12/1982 | Japan . |
| 58-199888 | 11/1983 | Japan . |
| 59-162138 | 9/1984 | Japan . |
| 452542 | 2/1973 | U.S.S.R. . |

OTHER PUBLICATIONS

Masterton et al., *Chemical Principles*, WB Saunders Co., 1977, p. 529.
*Dished Electrode Membrane Cell, High Efficiency Elec-*

(List continued on next page.)

*Primary Examiner*—Gary P. Straub
*Assistant Examiner*—Stephen G. Kalinchak
*Attorney, Agent, or Firm*—Ferrill and Logan

[57] ABSTRACT

The present invention discloses a process for rejuvenation of strip acid employed in the reclamation of expended lead-acid battery acid through extraction and filtration for removing metallic impurities from the battery acid. In the process of removing impurities from battery acid through extraction, the extractant becomes loaded with impurities and loses its effectiveness. Extractant may be regenerated by contacting it with an strip acid. In the present invention, a reduction process is employed to regenerate the strip acid so that it may be used repeatedly. By recycling the extractant and the strip acid in the present invention, the present process further increases the effectiveness of battery acid regeneration—producing a reclaimed battery acid fluid which performs very well in new batteries and substantially reducing by-product waste in the regeneration of the battery acid.

9 Claims, 1 Drawing Sheet

U.S. PATENT DOCUMENTS

| | | | |
|---|---|---|---|
| 4,383,104 | 5/1983 | Sasaki et al. | 528/148 |
| 4,414,183 | 11/1983 | Sasaki et al. | 423/7 |
| 4,444,666 | 4/1984 | Sato | 210/670 |
| 4,499,058 | 2/1985 | Fitoussi et al. | 423/70 |
| 4,501,666 | 2/1985 | Ogata et al. | 210/688 |
| 4,559,216 | 12/1985 | Nagai et al. | 423/531 |
| 4,582,691 | 4/1986 | Fujimoto et al. | 423/139 |
| 4,628,011 | 12/1986 | Feldman et al. | 429/49 |

OTHER PUBLICATIONS

*trolysis for Chemical Synthesis*, Electrocatalytic, Inc. 11/88.

*Ionac Ion Exchange Membranes*, Sybron Chemicals Inc. *Daramic 2005*, W. R. Grace & Co.

"Separation of Antimony and Arsenic by Extraction with Di-2-Ethylhexyldithiophosphoric Acid", Yukhim et al., vol. 45, No. 9, Zavodskaya Laboratories, pp. 798–800, Sep. 1979.

"Iron (III) Removal from Base-Metal Electrolyte Solutions by Solvent Extraction," G. P. Demopoulos, Hydrometallurgy 12 (1981), pp. 299–315.

"New Low-cost Wastewater Recovery Process" by Marge Boynton, Pollution Engineering, Feb. 1988, pp. 32, 34.

"Company Gets the Lead Out-And More", by G. Robert Hartup, Pollution Engineering, Dec., 1987, p. 66.

Article: Meliere, Gartside, McRae and Seamans, "Description and Operation of the Webster/Ionics $SO_2$ Removal and Recovery Pilot Plant at the Wisconsin Electric Power Company," EPA Flue Gas Desulfurization Symposium (1974).

Article: "A New Process Cuts Waste-Sludge Volume from Ore Leaching by About 80%," *Chemical Engineering* (Aug. 1989).

PROCESS FOR THE EXTENDED USE OF STRIP ACID EMPLOYED IN THE RECLAMATION OF BATTERY ACID FLUID FROM EXPANDED LEAD-ACID BATTERIES

The present application is a continuation-in-part of copending U.S. patent application Ser. No. 312,429, U.S. Pat. No. 4,971,780, issued Nov. 20, 1990, which is a continuation-in-part of U.S. patent application Ser. No. 133,132, Dec. 14, 1987 now abandoned.

BACKGROUND OF THE INVENTION

1. Field of the Invention

The present invention relates to an improvement in the method of removing contaminating impurities from used battery acid fluid through extraction and filtration so to permit the fluid to be used in new batteries or concentrated for sale. In particular, the method employs a reduction process to regenerate strip acid employed in rejuvenating iron removing extractant.

2. Description of the Prior Art

In copending patent application Ser. No. 312,429, a method is disclosed of handling the serious economic and environmental problem of disposing of contaminated sulfuric acid ($H_2SO_4$) solution contained in discarded lead-acid batteries. In order to reuse such solution in new batteries, it is necessary to remove various contaminating elements, the most serious of which being iron.

As disclosed in U.S. patent application Ser. No. 312,429, sulfuric acid from used lead-acid batteries may be reclaimed by employing discrete steps of filtration and extraction using an iron extractant agent comprising a mixture of a chelating agent, such as a derivative of an 8-hydroxyquinoline, an organophosphoric acid, a modifier, and a hydrocarbon carrier solution. Using multiple extraction steps, the extraction agent is mixed with contaminated battery acid fluid (diluted with distilled water or dilute sulfuric acid water) to remove the iron impurities. The extracted battery acid fluid is then filtered through a carbon filter to remove residual organics. The iron impurities are subsequently removed from the extraction agent in a concentrated form using a strip acid—permitting the extraction agent to be reused indefinitely. Through concentration or the addition of fresh sulfuric acid to overcome the water dilution, the reclaimed battery acid fluid may be placed in new lead-acid batteries. Tests reveal that this process produces a battery acid fluid which performs as well as fresh battery acid fluid, but is free of the costs and environmental risks of disposing of used battery acid fluid.

Although the above process functions exceptionally well, a new problem which emerges in reclaiming battery acid in this manner is that the strip acid becomes a by-product waste from this process which also must be disposed of. One method of increasing the efficient use of the strip acid is to use a counter-current rejuvenation process—whereby used strip acid having some iron content is contacted with extractant heavily contaminated with iron, and fresh strip acid is employed to remove the remaining contaminating iron from the extractant to complete rejuvenation. In this manner the iron content of the strip acid can be substantially increased before disposal. However, it is believed that the overall efficiency of the entire reclamation process may be even further improved if the iron content in the strip acid can be maximized.

Accordingly, it is a primary object of the present invention to increase the efficiency of battery acid reclamation by maximizing the amount of iron which can be removed from extractant through strip acid treatment.

Another object of the present invention is to provide an entire method of battery acid fluid reclamation which is commercially practical, requires minimal capital investment, is relatively inexpensive to operate, and minimizes environmental risk.

SUMMARY OF THE INVENTION

The present invention employs electrolytic treatment of strip acid to improve further the efficiency of, and further reduce the waste from, the process of removing iron impurities from lead-acid battery electrolyte solution through steps of extraction and filtration. Use of the present invention greatly reduces by-product waste in the sulfuric acid reclamation process while continuing to produce a reclaimed battery acid fluid which performs as well as fresh battery acid fluid.

The largest by-product of the reclamation process disclosed in the parent application Ser. No. 312,429 is the strip acid which is employed to rejuvenate the iron extractant. By increasing the amount of iron the strip acid can hold while still being able to rejuvenate the extractant, the efficiency of the entire system is greatly increased while the amount of waste generated by the system is greatly decreased. The present invention discloses a process which substantially increases the effective iron holding capacity of the strip acid.

The affinity for iron of the extractant employed in the process disclosed in parent application Ser. No. 312,429 (i.e. an extractant agent comprising a mixture of a chelating agent, such as a derivative of an 8-hydroxyquinoline, an organophosphoric acid, a modifier, and a hydrocarbon carrier solution) is limited to ferric ($Fe+3$) ions. It has been determined that by treating the strip acid to reduce the iron contained in it from ferric to ferrous ($Fe+2$) form, the strip acid may then be further contacted with extractant with essentially no decrease in the stripping efficiency of the strip acid. In this manner the strip acid may be used repeatedly, with a vastly increased total iron content, before the strip acid must be replaced.

The present invention increases the overall efficiency of the reclamation process and decreases the by-product waste generated by the process while adding little cost to the process and no decrease in the effectiveness of the battery acid produced.

DETAILED DESCRIPTION OF THE INVENTION

Figure 1:
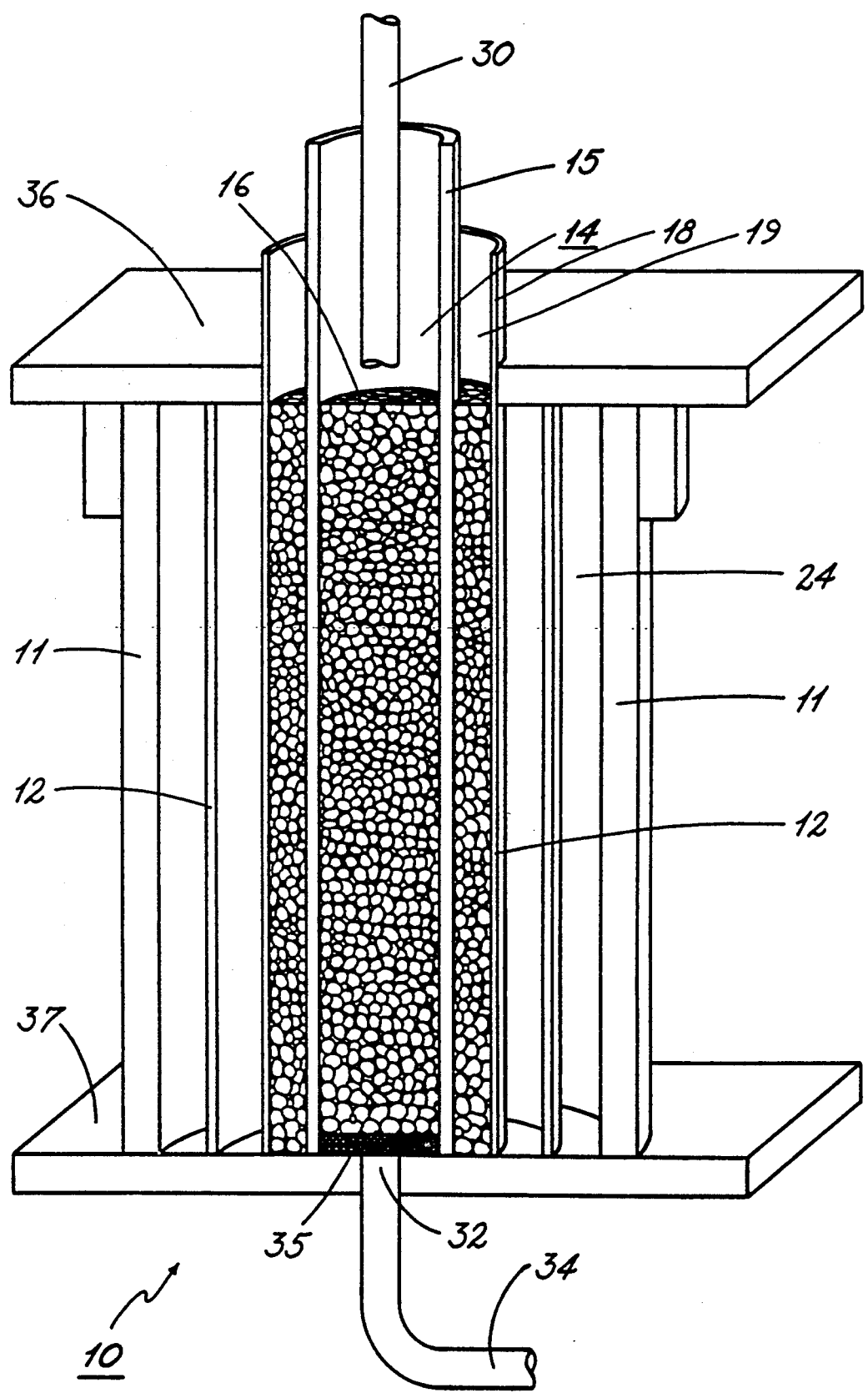
FIG. 1 is a cross-sectional view of the strip acid iron reduction cell of preferred embodiment of the present invention.

The present invention provides an improved method of processing contaminated battery acid fluid into reclaimed battery acid fluid through use of liquid-liquid extraction and filtration.

As is disclosed in U.S. patent application Ser. No. 312,429, battery acid fluid removed from used lead-acid type batteries can be reclaimed through a series of dilution, filtration, extraction, and concentration steps. The process entails treating battery acid fluid removed from used lead-acid type batteries comprising approximately 25% (1.18 specific gravity) sulfuric acid ($H_2SO_4$) diluted with various metallic impurities, including iron (about 40-150 ppm), and reducing the contaminating iron level to an acceptable level of less than 20 ppm. The process is set forth below.

First, the contaminated battery acid fluid is filtered through a conventional filter to remove suspended particle matter. Commercially available hydrolytic polypropylene filters have proven effective for this purpose.

Next, the battery acid is diluted using distilled water or dilute sulfuric acid water to a level of 15 to 18% sulfuric acid. This is in accordance with the work by Demopoulous and Gefvert reported in "Iron(III) Removal from Base-Metal Electrolyte Solutions By Solvent Extraction," 12 Hydrometallurgy 299, 303 (1984), which teaches that iron removal via extraction from an electrolytic solution is maximized in the area of 150 to 180 grams per liter (g/l) of $H_2SO_4$.

Although battery acid fluid normally contains iron in its ferric (Fe III) form, it has been found that satisfactory extraction using the below identified extraction agent will not occur if the iron is in a ferrous (Fe II) form. Accordingly, if a substantial quantity of ferrous iron is present, the fluid should be oxidized using conventional methods, such as blowing it with air or adding peroxide, to form ferric iron prior to extraction.

Liquid-liquid extraction is then performed on the contaminated battery acid fluid. The extraction agent employed is a mixture of a chelating agent, an organophosphoric acid, and a modifier, all dissolved in a water immiscible carrier. Use of such a compound for extraction of high concentrations of metals from electrolyte solution is disclosed in U.S. Pat. No. 4,067,802.

Specifically, the chelating agent employed is an 8-hydroxyquinoline substituted in the No. 7 position with a long chain aliphatic hydrocarbon radical ("8-hydroxyquinoline derivative"), and particularly a 7-[3-(5,5,7,7-tetramethyl-1-octenyl)] -8-hydroxyquinoline. This is commercially available under the trademark KELEX 100 produced by SHEREX Chemical Co., Inc. The organophosphoric acid is preferably a mono- or dialkyl phosphoric acid, such as a di-2-ethylhexyl phosphoric acid ("DEHPA"). The respective 8-hydroxyquinoline derivative and the organophosphoric acid are mixed at a molar ratio between 1:1 to 1:4. The modifier serves to maintain the solubility of the extraction agent in the carrier and enhances the phase disengagement. It may be either alkyl phosphates or high molecular weight alcohols. Tridecanol is preferred.

As is disclosed in U.S. Pat. No. 4,067,802, the water immiscible carrier should be a hydrocarbon solvent which dissolves both the chelating agent and the phosphoric acid and should be chemically stable, low in toxicity, and have a high flash point. Preferred is odorless mineral spirits.

A mixture containing 30% extraction agent and 70% mineral spirits typically comprises 6.8 volume % (within a range of 5 to 10%) of 8-hydroxyquinoline derivative, 12.4 volume % (within a range of 10 to 15%) DEHPA, and 10.8 volume % (within a range of 5 to 10%) tridecanol. The ratio of extraction agent to mineral spirits may range from 5:95 to 50:50.

The extraction mixture is then mixed with the diluted contaminated battery acid fluid in ratios ranging from 4:1 to 1:4. The preferred mixture is at a ratio of about 1:1 with the use of multiple extraction steps, where necessary.

Once the iron content is brought to levels of 20 ppm, the extracted battery acid fluid is then passed through a polish filter which comprises a granular or powdered activated carbon filter, such as a packed column or flat bed filter unit. Activated carbon sold under the trademark NUCHAR SA by Westvaco has proven effective in removing both organics and some metallic impurities. This removes unwanted organic impurities from the solution, such as residual extraction agent, and produces the reclaimed battery acid fluid. When the flow from the carbon filter is no longer clear, the carbon is replaced.

Finally, the 15% acid may be concentrated under vacuum by heating, or concentrated sulfuric acid may be added to the reclaimed battery acid fluid, to return the fluid to approximately 35% sulfuric acid (1.265 specific gravity). The reclaimed battery acid fluid may then be placed in new batteries.

As is also disclosed in the parent application, it has been found that the above extraction agent may be reclaimed and used indefinitely. This is accomplished by contacting the extraction agent with a strip acid which removes the contaminating iron content. The process disclosed entails repeatedly mixing the extraction agent with a strip acid of approximately 35% $H_2SO_4$ (within a range of 30 to 50% $H_2SO_4$), the metal contaminants will pass from the extraction agent to the strip acid. Waste is further lessened by repeatedly using the strip acid. Using either conventional cross flow or conventional counter current flow techniques, the strip acid may be used for multiple extraction steps: the purest strip acid is used to remove contaminants from the purest extraction agent, and then it is reused to remove contaminants from less pure extraction agent; this process continues until the strip acid is effectively loaded with contaminants.

The parent application discloses a separate stripping test which was performed to determine the efficiency of the strip acid process. In this test, the same quantity of acid was used repeatedly to regenerate previously used extractant. It was found that levels of iron in excess of 1000 ppm did not reduce the stripping efficiency as long as the acid strength of the strip acid was maintained at 35% by the addition of concentrated acid, or within a concentration range of approximately 400 g/l to 500 g/l. This is due to the fact that the extractant transfers acid from a more concentrated stream (the strip acid) to a less concentrated stream (the battery fluid). The overall effect is that the iron in the strip acid is concentrated by a factor of 5-30 times as compared to waste battery fluid. As is explained, under these conditions, a two-stage cross flow technique is believed to function quite well to regenerate the extraction agent—fresh acid used to strip partially clean extraction agent in stage-two, and contaminated acid (e.g. strip acid too contaminated to continue to serve in stage-two) employed in stage-one to produce partially clean extraction agent for stage-two. Once the strip acid lost its ability to strip iron from extractant, it was believed that the only option was to dispose of it through conventional disposal techniques.

The present invention is directed at further improvement in the efficiency of the extractant reclamation process. It has been determined that the efficiency of the entire strip acid regeneration process may be improved significantly through use of carbon or electrolytic treatment of the strip acid. As has been discussed above, it is known that the extractant absorbs iron only when it is in a ferric (Fe III) state; the extractant is essentially "blind" to iron in the ferrous (Fe II) state. By treating the used strip acid to reduce the iron ions from ferric to ferrous, it has been determined that the strip acid may be reused to regenerate extractant with no adverse effect on the regeneration process—the extractant continues to release its ferric iron content to the strip acid while re-absorbing none of the ferrous iron contained in the strip acid. In this manner, the strip acid can be used and re-used far beyond the level of iron stripping effectiveness previously achieved.

The effectiveness of the present invention is demonstrated by the following examples:

EXAMPLE 1

As a control, battery acid regeneration and extractant reclamation was performed in a continuous pilot plant in the manner disclosed in the parent application. This process comprised treating contaminated sulfuric acid from lead-acid batteries in a six stage counter-current extraction circuit with an extraction agent containing 6.8 v/o Kelex 100, 12.4 v/o DEHPA, 10.8 v/o tridecyl alcohol, and 70 v/o odorless mineral spirits (30% Sherex Iron Reagent/70% mineral spirits). The extraction agent, loaded with 30–40 ppm ferric iron, was regenerated (i.e. "stripped") with 35% sulfuric acid to remove the iron. The strip acid was reused until it was no longer able to remove iron from the extraction agent. The iron level in the strip acid a maximum of about 450 ppm.

EXAMPLE 2

Loaded extraction agent, generated as in Example 1, was stripped with 35% sulfuric acid. The strip acid was passed from a strip acid reservoir through a bed of activated carbon prior to reusing it in order to reduce the contained iron from ferric to ferrous. The carbon in the bed was replaced when no increase in the iron concentration of the strip acid was measured. The maximum level of iron in the strip acid reached about 1120 ppm.

EXAMPLE 3

The activated carbon bed used in Example 2 was removed from the circuit. Two electrodes (an anode and a cathode), connected to a D.C. power source, were placed in the strip acid reservoir. The anode was placed inside an envelope made of a microporous polyethylene diaphragm material (specifically, material supplied by W. R. Grace & Co. under the trademark DARAMAC) to separate it from the strip acid in the reservoir. The envelope was filled with 35% sulfuric acid. An electric current of 1 amp at 3 volts was passed through the cell, causing oxygen gas to be liberated at the anode and iron to be reduced from ferric to ferrous at the cathode (as well as having hydrogen gas liberated at the cathode). Using this method, the iron level in the strip acid reach a level of 2600 ppm before losing effectiveness and the ferric ion content of the strip acid was maintained below 500 ppm.

It is preferred that the invention be carried out in a flow-through cell which permits the continuous treatment of strip acid. One such cell is shown in FIG. 1. The cylindrical cell 10 includes an outer wall 11, an anode 12, a separator 18 and a cathode 14. The anode 12 and the cathode 14 are connected to a d.c. power supply (not shown). The cathode 14 comprises a current carrier such as a lead grid 15 and pieces of either activated carbon, coke or graphite 16. The anode 12 comprises lead grid also. It should be understood that, without departing from the intent of the present invention, the anode 12 and the cathode 14 may be constructed from any suitable electrode material, including lead, carbon or titanium.

The cylindrical cathode 14 is housed within a separator wall 18 which defines the cathode chamber 19. The separator wall 18 shown is a cylinder constructed from a battery separator-type material. In the preferred embodiment, the separator material is an ion exchange membrane, such as the material sold under the trademark "IONAC MA 3475 Anion Membrane" by Sybron Chemicals, Inc., Birmingham, N.J. Other battery separator-type materials which will prevent mixing of the acid solutions in the cathode chamber and the anode chamber may be employed, including microporous polyethylene film, asbestos cloth or glass frit.

The anode chamber 24, which houses the cylindrical anode 12, surrounds the cathode chamber 19 and is enclosed in a length of PVC pipe 11 which is wider and concentric with the cathode chamber 19. Although PVC pipe and plate has been used in this embodiment for the wall 11 and for the top 36 and the bottom 37, it should be understood that any other material resistant to sulfuric acid and electriolytic processes may be substituted for one or all of these elements, including glass, polypropylene or teflon.

The electrical requirements of the cell 10 of the present invention are dependent upon a number of factors, including the size of the electrodes, the spacing of the electrode (i.e. the larger the cell 10, the greater the required voltage), and the size of the cell 10. The voltage through the cell 10 must be great enough to overcome the hydrogen potential on the cathode 14, the oxygen potential on the anode 12 and the resistance of the acid solutions. The ideal current density on the electrodes 14, 12 should be maintained within the range of 5 amps per sq. ft. to 25 amps per sq. ft. It is believed that the minimum voltage across the cell 10 should be about 3 volts. Additionally, it is believed that the cathode compartment 19 should be designed to be the minimum operative volume so to prevent backmixing of the treated and untreated strip acid.

In operation, the anode chamber 24 is filled with acid of the same concentration as the strip acid to the desired level. Used strip acid to be treated is introduced into the cell 10 from one or more intake lines 30 in the top of the cell 10. An outlet drain 32, covered with a polypropylene screen 35, is provided in the base of the cathode chamber 19 to carry away treated (reduced) strip acid. The level of strip acid in the cell 10 may be readily controlled by attaching a drain pipe 34 to the drain hole 32 and raising or lowering the pipe to achieve the desired fluid level within the cell 10. By applying an electric current through the cell 10 within the range of 0.5 amps at 3 volts to 3 amps at 4 volts, with the ideal range believed to be 1 amp at 3 volts to 2 amps at 3.3 volts, the strip acid can be continuously reduced and reused. The construction of the cell 10 allows it to be readily attached in-line in a continuous battery acid reclamation process. Under these electrical conditions, a cell 10 with an internal total volume of 0.6 liters should be able to treat continuously 0.6 to 3.0 liters per hour. It should be understood that the design of the electrolytic cell may be any desired shape, including cylindrical or rectangular (flat plate electrodes), without departing from the intent of the present invention.

The effective operation of the present invention should be appreciated by the following example:

EXAMPLE 4

A flow-through cell, as above described, was employed with an applied current of 2 amps at 3.3 volts. Using the above described method, the iron level in the first stage strip acid reached a level of 4135 ppm without losing effectiveness and the ferric ion content of the strip acid was maintained below 100 ppm.

The above examples reveal that the present invention further eliminates the waste problem of disposing of contaminated battery acid fluid by dramatically increasing the usefulness and effectiveness of the strip acid extraction agent reclamation process disclosed in the parent application.

While particular embodiments of the present invention have been disclosed herein, it is not intended to limit the invention to such a disclosure, and changes and modifications may be incorporated and embodied within the scope of the following claims.

What is claimed is:

1. In a method for recycling contaminated sulfuric acid from lead acid batteries to reclaimed sulfuric acid for reuse in said batteries by removing contaminating iron impurities, the steps which comprise:
   (a) diluting the contaminated sulfuric acid to a concentration between 150 and 230 grams per liter;
   (b) filtering the sulfuric acid through a first filter means to remove solid impurities;
   (c) oxidizing the sulfuric acid to assure that the iron contaminants are substantially in a ferric form;
   (d) removing the iron contaminants from the sulfuric acid through liquid-liquid extracting using an extraction agent comprising mixture of a mono- or di-alkyl phosphoric acid and a metal chelation collector selected from the group consisting of a 8-hydroxyquinoline substituted in the No. 7 position with a long chain aliphatic hydrocarbon radical and an oil-soluble 2-hydroxy benzophenoneoxime, a modifier which maintains solubility of the phosphoric acid and the metal chelation collector and enhances phase disengagement, and a water immiscible carrier, the molar ratio of the 8-hydroxyquinoline and the phosphoric acid being between 1:1::1:4, respectively; wherein the ratio of extraction agent to water immiscible carrier is greater than 10:90; said extraction performed at a volumetric ratio between said sulfuric acid and said extraction agent of between 4:1::1:4, and repeated until the contaminating iron impurities are substantially reduced;
   (e) filtering the product of step (d) to remove residual extraction agent;
   (f) adding concentrated sulfuric acid to return the sulfuric acid concentration of the product of step (e) to a sulfuric acid concentration for use in new lead acid batteries, the final concentration of iron in the sulfuric acid being no more than 20 parts per million; and
   (g) removing the contaminating elements from the extraction agent by contacting said extraction agent with a strip acid with an acid concentration of between 30 and 50%, the improvement which comprises:
   (h) reusing the extraction agent to perform further extractions of ferric iron from contaminated sulfuric acid solution;
   (i) treating the strip acid with means to reduce a portion of the removed ferric iron to ferrous iron;
   (j) reusing the strip acid product of step (i), containing reduced iron, in step (g) to remove contaminating ferric iron from extraction agent.

2. The method of claim 1 wherein the means to reduce the ferric iron to ferrous iron comprises
   passing the strip acid through a cell having an anode compartment and a cathode compartment separated by means to prevent mixing of sulfuric acid between the anode and cathode compartments, and
   applying electric current through the cell between the anode and the cathode to reduce the iron ions in the sulfuric acid in the cathode compartment of the cell.

3. The method of claim 2 wherein the electric current applied through the cell is at least 1 amp at 3 volts.

4. The method of claim 2 wherein the means to prevent mixing of sulfuric acid between the anode and cathode compartments comprises a material selected from the group comprising ion exchange membrane, microporous film, microporous polyethylene diaphragm material, glass frit, and asbestos cloth material.

5. The method of claim 1 wherein the means to reduce ferric iron to ferrous iron comprises passing the strip acid solution through a bed of activated carbon.

6. The method of claim 1 wherein the contaminated sulfuric acid solution has a concentration of between 150 to 230 g/l and the strip acid has a concentration of approximately 400 to 500 g/l.

7. In a method for recycling contaminated sulfuric acid from lead acid batteries to reclaimed sulfuric acid for reuse in said batteries by removing contaminating iron impurities, the steps which comprise:
   (a) diluting the contaminated sulfuric acid to a concentration between 150 and 230 grams per liter;
   (b) filtering the sulfuric acid through a first filter means to remove solid impurities;
   (c) oxidizing the sulfuric acid to assure that the iron contaminants are substantially in a ferric form;
   (d) removing the iron contaminants from the sulfuric acid through liquid-liquid extraction using an extraction agent comprising mixture of a mono- or di-alkyl phosphoric acid and a metal chelation collector selected from the group consisting of a 8-hydroxyquinoline substituted in the No. 7 position with a long chain aliphatic hydrocarbon radical and an oil-soluble 2-hydroxy benzophenoneoxime, a modifier which maintains solubility of the phosphoric acid and the metal chelation collector and enhances phase disengagement, with a water immiscible carrier, the molar ratio of the 8-hydroxyquinoline and the phosphoric acid being between 1:1::1:4, respectively; wherein the ratio of extraction agent to water immiscible carrier is greater than 10:90; said extraction performed at a volumetric ratio between said sulfuric acid and said extraction agent of between 4:1::1:4, and repeated until the contaminating iron impurities are substantially reduced;
   (e) filtering the product of step (d) to remove residual extraction agent;
   (f) adding concentrated sulfuric acid to return the sulfuric acid concentration of the product of step (e) to a sulfuric acid concentration for use in new lead acid batteries, the final concentration of iron in the sulfuric acid being no more than 20 parts per million; and (g) removing the contaminating elements from the extraction agent by contacting said extraction agent with a strip acid with an acid concentration of between 30 and 50%, the improvement which comprises:

(h) reusing the extraction agent to perform further extractions of ferric iron from contaminated sulfuric acid solution;

(i) treating the strip acid with means to reduce a portion of the removed ferric iron to ferrous iron;

(j) reusing the strip acid product of step (i), containing reduced iron, in step (g) to remove contaminating ferric iron from extraction agent;

wherein the means to reduce the ferric iron to ferrous iron comprises passing the strip acid through a cell having an anode compartment and a cathode compartment separated by means to prevent mixing of sulfuric acid between the anode and cathode compartments, and applying electric current through the cell between the anode and the cathode to reduce the iron ions in the sulfuric acid in the cathode compartment of the cell.

8. The method of claim 7 wherein the cell is provided with intake means in the cell to receive contaminated strip acid containing iron substantially in a ferric form, and outlet means in the cell to deliver treated strip acid containing iron substantially in a ferrous form.

9. The method of claim 7 wherein the means to prevent mixing of sulfuric acid between the anode and cathode compartments comprises a material selected from the group comprising ion exchange membrane, microporous film, microporous polyethylene diaphragm material, glass frit, and asbestos cloth material.

* * * * *

UNITED STATES PATENT AND TRADEMARK OFFICE
CERTIFICATE OF CORRECTION

PATENT NO. : 5,009,868

DATED : April 23, 1991

INVENTOR(S) : Spitz et al.

It is certified that error appears in the above-identified patent and that said Letters Patent is hereby corrected as shown below:

On the title page:
Item [54], in the Title of the invention, change "EXPANDED" to --EXPENDED--.

Col. 1, line 4, change "EXPANDED" to --EXPENDED--.

Signed and Sealed this

Twenty-fifth Day of August, 1992

Attest:

DOUGLAS B. COMER

Attesting Officer

Acting Commissioner of Patents and Trademarks